US009588511B2

(12) United States Patent
Gray

(10) Patent No.: US 9,588,511 B2
(45) Date of Patent: Mar. 7, 2017

(54) VIRTUAL MACHINE MANAGER

(75) Inventor: Paul J. Gray, Zionsville, IN (US)

(73) Assignee: Hurco Companies, Inc., Indianapolis, IN (US)

(*) Notice: Subject to any disclaimer, the term of this patent is extended or adjusted under 35 U.S.C. 154(b) by 513 days.

(21) Appl. No.: 12/765,586

(22) Filed: Apr. 22, 2010

(65) Prior Publication Data

US 2010/0274380 A1    Oct. 28, 2010

Related U.S. Application Data

(60) Provisional application No. 61/171,839, filed on Apr. 22, 2009, provisional application No. 61/172,044, filed on Apr. 23, 2009.

(51) Int. Cl.
| | |
|---|---|
| *G05B 13/04* | (2006.01) |
| *G05B 19/18* | (2006.01) |
| *G06G 7/66* | (2006.01) |
| *G05B 19/4097* | (2006.01) |

(52) U.S. Cl.
CPC ............ *G05B 19/4097* (2013.01); *G05B 2219/49017* (2013.01); *G05B 2219/49029* (2013.01)

(58) Field of Classification Search
CPC ...... G05B 19/4097; G05B 2219/49029; G05B 2219/49017
USPC ............ 700/97, 98, 104, 159, 160, 182, 184
See application file for complete search history.

(56) References Cited

U.S. PATENT DOCUMENTS

| | | | |
|---|---|---|---|
| 4,131,836 A | 12/1978 | Noda | |
| 4,138,718 A | 2/1979 | Toke et al. | |
| 4,281,379 A | 7/1981 | Austin | |
| 4,393,450 A * | 7/1983 | Jerard | 700/182 |
| 4,489,377 A | 12/1984 | Mawyer et al. | |
| 4,794,514 A | 12/1988 | Hideaki et al. | |
| 4,937,768 A * | 6/1990 | Carver et al. | 700/182 |
| 4,945,488 A * | 7/1990 | Carver et al. | 700/182 |
| 4,956,764 A * | 9/1990 | Carver et al. | 700/59 |
| 4,994,980 A * | 2/1991 | Lee et al. | 700/173 |
| 5,023,800 A * | 6/1991 | Carver et al. | 700/182 |
| 5,033,014 A * | 7/1991 | Carver et al. | 700/182 |
| 5,248,924 A | 9/1993 | Niwa | |
| 5,368,539 A | 11/1994 | Mills et al. | |
| 5,400,259 A | 3/1995 | Murphy et al. | |

(Continued)

FOREIGN PATENT DOCUMENTS

| | | |
|---|---|---|
| EP | 0 328 666 A1 | 8/1989 |
| EP | 0 519 077 A1 | 12/1992 |

(Continued)

OTHER PUBLICATIONS

Krovi, Venkat, Kumar, Vijay, Ananthasuresh, G.K., and Vezien, Jean-Marc, "Design and Virtual Prototyping of Rehabilitation Aids," ASME Journal of Mechanical Design, vol. 121, No. 3, pp. 456-458, Sep. 1999.

(Continued)

*Primary Examiner* — Charles Kasenge
(74) *Attorney, Agent, or Firm* — Faegre Baker Daniels LLP

(57) ABSTRACT

Systems and methods for virtual machine management are disclosed. A virtual machine manager may communicate with a storehouse, which may include one or more virtual machines. The virtual machine manager may select one or more virtual machines, or may create one or more virtual machines, depending on the requirements of an input.

29 Claims, 17 Drawing Sheets

(56) References Cited

U.S. PATENT DOCUMENTS

| | | | |
|---|---|---|---|
| 5,417,130 A | 5/1995 | Dorsch | |
| 5,453,933 A | 9/1995 | Wright et al. | |
| 5,611,032 A | 3/1997 | Matsuura et al. | |
| 5,659,493 A * | 8/1997 | Kiridena et al. | 703/2 |
| 5,691,909 A | 11/1997 | Frey et al. | |
| 5,735,513 A | 4/1998 | Toffolon | |
| 5,907,494 A * | 5/1999 | Dangelo et al. | 703/1 |
| 5,988,852 A * | 11/1999 | Nakanishi | 700/83 |
| 6,019,554 A | 2/2000 | Hong | |
| 6,022,132 A | 2/2000 | Schulz | |
| 6,356,800 B1 * | 3/2002 | Monz et al. | 700/184 |
| 6,415,191 B1 * | 7/2002 | Pryor | 700/95 |
| 6,445,959 B1 | 9/2002 | Poth | |
| 6,445,964 B1 | 9/2002 | White et al. | |
| 6,456,893 B1 * | 9/2002 | Nakanishi | 700/96 |
| 6,502,002 B2 | 12/2002 | Susnjara et al. | |
| 6,565,497 B1 * | 5/2003 | Yamazaki et al. | 483/11 |
| 6,612,004 B2 * | 9/2003 | Yamazaki et al. | 29/27 C |
| 6,671,572 B1 * | 12/2003 | Craft et al. | 700/184 |
| 6,745,098 B2 | 6/2004 | Belanger | |
| 6,862,553 B2 * | 3/2005 | Schwenke et al. | 700/83 |
| 6,949,055 B2 | 9/2005 | Ferrari et al. | |
| 6,999,841 B1 | 2/2006 | Rutkowski | |
| 7,024,272 B2 * | 4/2006 | Thomas et al. | 700/182 |
| 7,117,056 B2 | 10/2006 | Balic | |
| 7,127,322 B2 | 10/2006 | Kreidler et al. | |
| 7,209,800 B2 * | 4/2007 | Monz et al. | 700/184 |
| 7,251,543 B2 * | 7/2007 | Nakamura | 700/178 |
| 7,283,888 B2 * | 10/2007 | Evans et al. | 700/186 |
| 7,286,898 B2 * | 10/2007 | Parmenter et al. | 700/182 |
| 7,356,937 B2 * | 4/2008 | Nishibashi et al. | 33/502 |
| 7,440,874 B2 | 10/2008 | Durney et al. | |
| 7,526,359 B2 * | 4/2009 | Landers et al. | 700/182 |
| 7,590,458 B2 | 9/2009 | Endo et al. | |
| 7,684,890 B2 * | 3/2010 | Grossmann et al. | 700/182 |
| 7,684,891 B2 * | 3/2010 | Okrongli et al. | 700/179 |
| 7,847,506 B2 * | 12/2010 | Ogawa | 318/574 |
| 7,979,254 B2 * | 7/2011 | Ohashi et al. | 703/7 |
| 8,024,068 B2 * | 9/2011 | Gray | 700/159 |
| 8,175,861 B2 * | 5/2012 | Huang et al. | 703/13 |
| 2002/0133264 A1 * | 9/2002 | Maiteh et al. | 700/182 |
| 2002/0133267 A1 * | 9/2002 | Landers et al. | 700/182 |
| 2003/0114945 A1 * | 6/2003 | Hirano et al. | 700/97 |
| 2003/0195642 A1 | 10/2003 | Ragnini | |
| 2003/0204285 A1 * | 10/2003 | Thomas et al. | 700/182 |
| 2004/0128016 A1 | 7/2004 | Stewart | |
| 2006/0004554 A1 * | 1/2006 | Vega et al. | 703/6 |
| 2007/0061037 A1 | 3/2007 | Grossmann et al. | |
| 2007/0191982 A1 | 8/2007 | Sullivan | |
| 2007/0288224 A1 * | 12/2007 | Sundarrajan et al. | 703/22 |
| 2008/0033591 A1 | 2/2008 | Lankalapalli et al. | |
| 2008/0033592 A1 * | 2/2008 | Okrongli et al. | 700/179 |
| 2008/0058982 A1 * | 3/2008 | Gray | 700/159 |
| 2008/0058984 A1 | 3/2008 | Gray et al. | |
| 2008/0091394 A1 | 4/2008 | Hahn et al. | |
| 2008/0147209 A1 * | 6/2008 | Landgraf | 700/29 |
| 2009/0271026 A1 | 10/2009 | Lerisson et al. | |
| 2009/0312858 A1 | 12/2009 | Alpay et al. | |
| 2010/0023156 A1 | 1/2010 | Trepina et al. | |
| 2010/0031487 A1 | 2/2010 | Messina et al. | |

FOREIGN PATENT DOCUMENTS

| | | |
|---|---|---|
| EP | 1 528 454 A2 | 5/2005 |
| JP | 3037703 A | 2/1991 |
| JP | 2003316405 | 11/2003 |
| WO | WO 2004/025400 A2 | 3/2004 |
| WO | WO 2009/037066 A1 | 3/2009 |
| WO | WO 2010/003882 A2 | 1/2010 |

OTHER PUBLICATIONS

Luo, Y.B., Ong, S.K., Chen, D.F., and Nee, A.Y.C., "An Internet-enabled image- and model-based virtual machining system," Int. J. Prod. Res., vol. 40, No. 10, pp. 2269-2288, 2002.

Xu, X.W., Wang, H., Mao, J., Newman, S.T., Kramer, T.R., Proctor, F.M., and Michaloski, J.L., "STEP-compliant NC research: the search for intelligent CAD/CAPP/CAM/CNC integration," Int. J. Prod. Res., vol. 43, No. 17, pp. 3703-3743, Sep. 1, 2005.

Yusof, Yusri, Newman, Stephen, Nassehi, Aydin, and Case, Keith, "Interoperable CNC System for Turning Operations," World Academy of Science, Engineering and Technology, vol. 49, pp. 928-934, 2009.

Roth, D., Ismail, F., and Bedi, S., "Mechanistic modelling of 5-axis milling using an adaptive depth buffer," pp. 1-40, 2003.

* cited by examiner

Machine_ =

CNC has instance of VMM
and Virtual Machine model

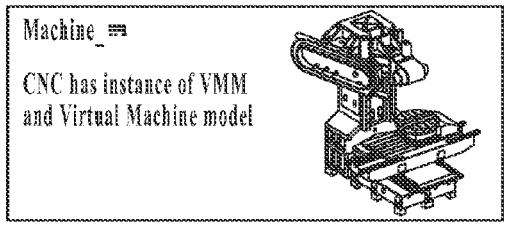

```
Virtual Machine Manager

Additional functions:
Get_List_Of_Networked_Machines(~)

Create All Networked Virtual Machines(~)
{
   i=0.
   while(!NetworkMachineList.IsEnd0)
   {
      Create_Virtual_Machine(NetworkMachineList.GetMachine()→
                                    Get_Virtual_Machine());
      VirtualMachine VM = Get_Virtual_Machine(i);
      VM→ Set_Tool_Database(NetworkMachineList.GetMachine() →
                                    Get_Tool_Database());
      NetworkMachineList.IndexToNext();
      i++;
   }
}

Additional Data:
NetworkMachineList
```

```
Virtual Machine

Additional functions:
Set_Tool_Database(~)

Additional Data:
ToolDatabase
```

Fig. 9A
Virtual Machine Manager networked machine list initialization

Multiple Virtual Machine instances for m number of search paths

Fig. 11

Storehouse — 266

Milling program in Zone 1 & 2 on 3-axis VTXZ Machine. Simulating different program in Zone 1.
User ID 1 = Milling process (HS1)
User ID 2 = Simulation process (HS2)

| # | Name | Kinematics Machine | State Machine | User ID | Locked (y/n) | Zone # | Copy # (1..n) | Real Machine (y/n) |
|---|------|--------------------|---------------|---------|--------------|--------|---------------|--------------------|
| 1 | VTXZ 1 | KM1 | SM1 | 1 | y  462 | 1 | 1 | y |

460

Storehouse

Milling program in Zone 1 & 2 on 3-axis VTXZ Machine. Simulating different program in Zone 1.
User ID 1 = Milling process (HS1)
User ID 2 = Simulation process (HS2)

| # | Name | Kinematics Machine | State Machine | User ID | Locked (y/n) | Zone # | Copy # (1,n) | Real Machine (y/n) |
|---|---|---|---|---|---|---|---|---|
| 1 | VTXZ 1 | KM1 | SM1 | 1 | y  462 | 1 | 1 | y |
| 2 | VTXZ 2 | KM2 | SM2 | 1 | y | 2 | 1 | y |
| 3 | VTXZ 3 | KM3 | SM3 | 2 | y  468 | 1 | 2 | y |

Storehouse 266

Milling program in Zone 1 & 2 on 3-axis VTXZ Machine. Simulating different program for SR Machine.
User ID 1 = Milling process (HS1)
User ID 2 = Simulation process (HS2)

| # | Name | Kinematics Machine | State Machine | User ID | Locked (y/n) | Zone # | Copy # (1..n) | Real Machine (y/n) |
|---|------|--------------------|---------------|---------|--------------|--------|---------------|---------------------|
| 1 | VTXZ 1 | KM1 | SM1 | 1 | y  462 | 1 | 1 | y |
| 2 | VTXZ 2 | KM2 | SM2 | 1 | y | 2 | 1 | y |
| 3 | VTXZ 3 | KM3 | SM3 | 2 | n  468 | 1 | 2 | y |
| 4 | SR 1 | KM4 | SM4 | 2 | y | 0 | 1 | n |

460 — row 1
469 — row 2
466 — row 3
471 — row 4

Fig. 14

Storehouse — 266

Milling program in Zone 1 & 2 on 3-axis VTXZ Machine, Simulating different program for 3-axis machine, Simulation using compatibility rules.
User ID 1 = Milling process (HS1)
User ID 2 = Simulation process (HS2)

| # | Name | Kinematics Machine | State Machine | User ID | Locked (y/n) | Zone # | Copy # (1..n) | Real Machine (y/n) |
|---|------|--------------------|---------------|---------|--------------|--------|---------------|--------------------|
| 1 | VTXZ 1 | KM1 | SM1 | 1 | y 462 | 1 | 1 | y |
| 2 | VTXZ 2 | KM2 | SM2 | 1 | y | 2 | 1 | y |
| 3 | VTXZ 3 | KM3 | SM3 | 2 | y 468 | 1 | 2 | y |
| 4 | SR 1 | KM4 | SM4 | 2 | n 474 | 0 | 1 | n |

460 → row 1
469 → row 2
466 → row 3
471 → row 4

VIRTUAL MACHINE MANAGER

CROSS REFERENCE TO RELATED APPLICATIONS

This application claims priority from U.S. Provisional Patent Application Ser. No. 61/172,044, filed Apr. 23, 2009, titled "VIRTUAL MACHINE MANAGER," and U.S. Patent Application Ser. No. 61/171,839, filed Apr. 22, 2009, titled "VIRTUAL MACHINE MANAGER," the disclosures of which are expressly incorporated by reference herein.

This application is related to U.S. patent application Ser. No. 11/833,971, filed Aug. 3, 2007, titled "GENERALIZED KINEMATICS SYSTEM", U.S. Patent Application Ser. No. 61/171,827, filed Apr. 22, 2009, titled "UNIVERSAL CONVERSATIONAL PROGRAMMING FOR MACHINE TOOL SYSTEMS", U.S. Patent Application Ser. No. 61/171,794, filed Apr. 22, 2009, titled "MULTI-ZONE MACHINE TOOL SYSTEM", U.S. Patent Application Ser. No. 61/171,963, filed Apr. 23, 2009, titled "UNIVERSAL CONVERSATIONAL PROGRAMMING FOR MACHINE TOOL SYSTEMS", U.S. Patent Application Ser. No. 61/172,066, filed Apr. 23, 2009, titled "MULTI-ZONE MACHINE TOOL SYSTEM", U.S. patent application Ser. No. 12/765,352 filed Apr. 22, 2010, titled "UNIVERSAL CONVERSATIONAL PROGRAMMING FOR MACHINE TOOL SYSTEMS", and U.S. patent application Ser. No. 12/765,543 filed Apr. 22, 2010, titled "MULTI-ZONE MACHINE TOOL SYSTEM", the disclosures of which are expressly incorporated by reference herein.

BACKGROUND

The present disclosure relates to machine tool systems and the operation thereof, and in particular to virtual machine manager systems wherein the virtual machine manager system creates and/or manages one or more virtual machines.

Differing machine tool systems may include different kinematics. Often these differing machine tool systems may include programming software specific to the kinematics of the specific machine tool system.

SUMMARY

In one embodiment, a machine manager is provided. The machine manager may include a storehouse, and the storehouse may include at least one virtual machine in an electronic storage. Each of the virtual machines may be associated with at least one virtual kinematics machine, and each of the at least one virtual kinematics machines may describe the kinematics of at least one machine tool system. The machine manager may also include a virtual machine manager associated with one or more electronic processors. The virtual machine manager may be operable to receive an input and provide one or more virtual machines from the storehouse, if the input is compatible with at least one of the one or more virtual machines from the storehouse, or generate at least one new virtual machine if the input is not compatible with at least one of the one or more virtual machines.

In another embodiment, a method for creating a virtual machine may comprise providing a virtual machine manager associated with one or more electronic processors. In the embodiment, the virtual machine manager may be operable to select one or more virtual machines from a storehouse, where each of the one or more virtual machines may be associated with at least one virtual kinematics machine. Each of the at least one virtual kinematics machines may describe the kinematics of at least one machine tool system. The method may further comprise receiving a request for a virtual machine. The method may also include generating a new virtual machine based at least in part on at least one of the virtual machines from the storehouse, and providing the new virtual machine.

In another embodiment, a method for providing a virtual machine may comprise providing a virtual machine manager associated with one or more electronic processors. In the embodiment, the virtual machine manager may be operable to select one or more virtual machines from a storehouse, where each of the one or more virtual machines may be associated with at least one virtual kinematics machine. Each of the at least one virtual kinematics machines may describe the kinematics of at least one machine tool system. The method may further comprise receiving a request for a virtual machine. The method may also include selecting one or more of the one or more virtual machines in the storehouse, based at least in part on a selection criteria. The method may also include providing the one or more virtual machines.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIGS. 9A and 9B relate to a scheduling application for the virtual machine manager;

FIGS. 11-14 are representative views of the storehouses of FIGS. 5-8.

Corresponding reference characters indicate corresponding parts throughout the several views.

DETAILED DESCRIPTION OF THE DRAWINGS

The embodiments disclosed herein are not intended to be exhaustive or limit the invention to the precise form disclosed in the following detailed description. Rather, the embodiment is chosen and described so that others skilled in the art may utilize its teachings.

Figure 1:
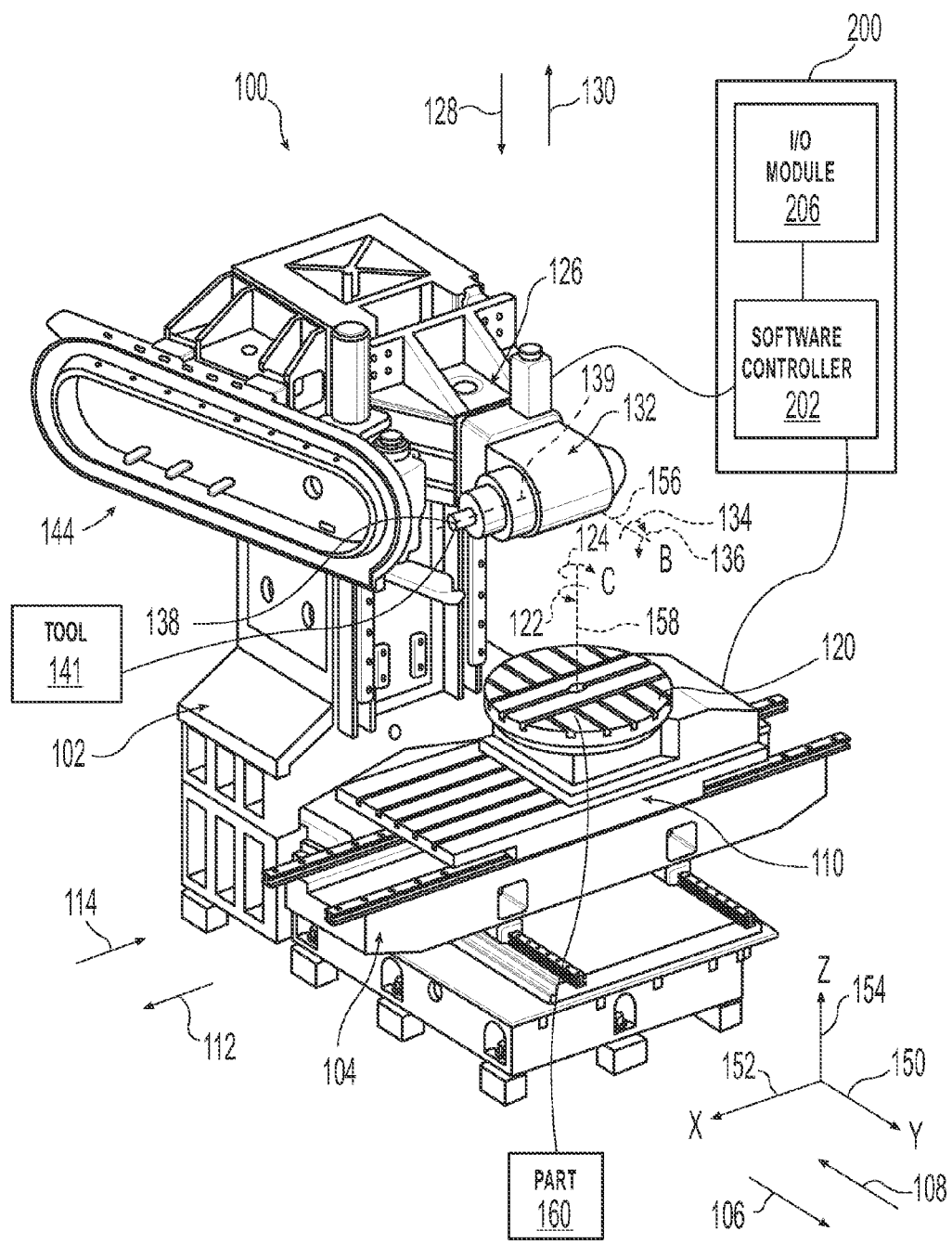
FIG. 1 illustrates an exemplary machine tool system.

Referring to FIG. 1, a machine tool system 100 is shown having a motion control system 200. Machine tool system 100 is exemplary only, and machine tools may include systems with any number of axes. In one embodiment, a machine tool may include a lathe or a lathe system. Machine tool system 100 includes a frame 102 having a first saddle 104 coupled thereto. Saddle 104 is translatable in directions 106 and 108. A second saddle 110 is supported by first saddle 104. Saddle 110 is translatable in directions 112 and 114 relative to saddle 104. A platform 120 is supported by saddle 110 and is rotatable relative to saddle 110 in directions 122 and 124. In one embodiment, each of saddle 104, saddle 110, and platform 120 are moveable through motors which are controlled by motion control system 200.

Further, a third saddle 126 is supported by frame 102. Saddle 126 is translatable in directions 128 and 130. Saddle 126 supports a rotatable member 132. Rotatable member 132 is rotatable in directions 134 and 136 relative to saddle 126. In one embodiment, each of saddle 126 and rotatable member 132 are moveable through motors which are controlled by motion control system 200.

A tool spindle 138 is supported by platform 132. Various tools 141 may be coupled to tool spindle 138 to perform various operations with machine tool system 100. Exemplary tools include and an end mill, a drill, a tap, a reamer, and other suitable tools. Tool spindle 138 is rotatable about a tool spindle axis 139 to input a rotation to the tool 141. In one embodiment, a plurality of tools 141 are stored in a tool carousel 144. Additional details about tool carousel 144 are provided in U.S. Provisional Application Ser. No. 60/821,481 and in U.S. Utility application Ser. No. 11/890,384, the disclosure of which is expressly incorporated by reference herein.

The movement of saddle 104 in direction 106 or direction 108 is illustrated as a movement in a y-axis 150. The movement of saddle 110 in direction 112 or direction 114 is illustrated as a movement in a x-axis 152. The movement of saddle 126 in direction 128 and direction 130 is illustrated as a movement in a z-axis 154. The rotation of rotatable member 132 in direction 134 or direction 136 is illustrated as a movement in a B-axis 156. The rotation of platform 120 in direction 122 or direction 124 is illustrated as a movement in a C-axis 158. Machine tool system 100 is an exemplary 5-axis machine. In one embodiment, one of B-axis 156 and C-axis 158 is replaced with an A-axis (not shown) wherein platform 120 is tiltable about one of x-axis 152 and y-axis 150.

Through the movement of one or more of the 5-axes of machine tool system 100 a tool 141 may be positioned relative to a part 160 supported by platform 120 to be machined. Part 160 may be secured to platform 120 to maintain the position of part 160 relative to platform 120.

The movement of one or more of the 5-axes of machine tool system 100 is controlled through motion control system 200. Motion control system 200 includes a software controller 202 and one or more I/O modules 206. It should be understood that the methods disclosed herein may be executed by software controller 202 and be stored in a memory in a manner associated with software controller 202.

Software controller 202 receives a machine configuration and input data, such as a part program, and then provides output data, such as position data for the various axes 150, 152, 154, 156, and 158 of machine tool system 100. As described in U.S. patent application Ser. No. 11/833,971, filed Aug. 3, 2007, titled "GENERALIZED KINEMATICS SYSTEM", the disclosure of which is expressly incorporated by reference herein, the machine configuration data provides the relationships between the various axes of a machine tool system. In relation to machine tool system 100, the machine configuration data provides the dependencies between the various axes 150, 152, 154, 156, and 158 of machine tool system 100 as well as the attributes of each axis. For instance, as saddle 104 moves in direction 106 the location of C-axis 158 is changed. Therefore, the location of C-axis 158 depends on the location of saddle 104.

Exemplary I/O modules 206 include input members, such as a user interface, a touch display, a keyboard, a mouse, one or more buttons or switches, a CD drive, a floppy drive, an interface to a network (wireless or wired), and other suitable devices for providing information to software controller 202 and output members, such as a display (such as a touch screen), lights, printer, and other suitable devices for presenting information.

In one embodiment, a part program is entered through a conversational mode of operation whereby a user during a programming session is presented with one or more screens through a user interface (such as a touch screen and keyboard). During the programming session, the user may program the desired geometry for the machined part and specify one or more attributes. In one example, the user specifies the desired geometry for the machined part by creating blocks of code each of which specifies a tool and a trajectory of the tool. As such, the geometry of the machined part is defined based on the operations used to create the machined part. An exemplary method of conversational programming is disclosed in U.S. Patent Application Ser. No. 61/171,827, filed Apr. 22, 2009, titled "UNIVERSAL CONVERSATIONAL PROGRAMMING FOR MACHINE TOOL SYSTEMS", the disclosure of which is expressly incorporated by reference herein. The conversational programming disclosed in the UNIVERSAL CONVERSATIONAL PROGRAMMING FOR MACHINE TOOL SYSTEMS application provides a programming arrangement which is not machine specific, but rather specifies machine independent information for machining the part, such as tool tip position and tool vectors or machining feature geometry.

In one embodiment, the part program is provided through a numerical control ("NC") mode of operation whereby an NC program is loaded into software controller 202. Part programs are frequently expressed in a standard G&M code language, or a close derivative of this language based on either the International Standards Organization (ISO) or the Electronics Industries Association (EIA) RS-274-D, using codes identified by letters such as G, M, and F. The codes define a sequence of machining operations to control motion in the manufacture of a part. Software controller 202 converts the codes to provide location positions for the various axes 150, 152, 154, 156, and 158 of machine tool system 100. In one embodiment, the part program is parsed by a parser of software controller 202 which reviews the part program and identifies various geometry segments. Exemplary geometry segments include lines and arcs.

Regardless of the origin of the part program, the part program defines the desired geometry for the machined part either directly or based on the operations used to create the part. However, the part program may not specify the positions of saddles 104, 110, and 126 nor the rotations of platform 120 and rotatable member 132. These positions are determined by software controller 202.

Figure 2A:
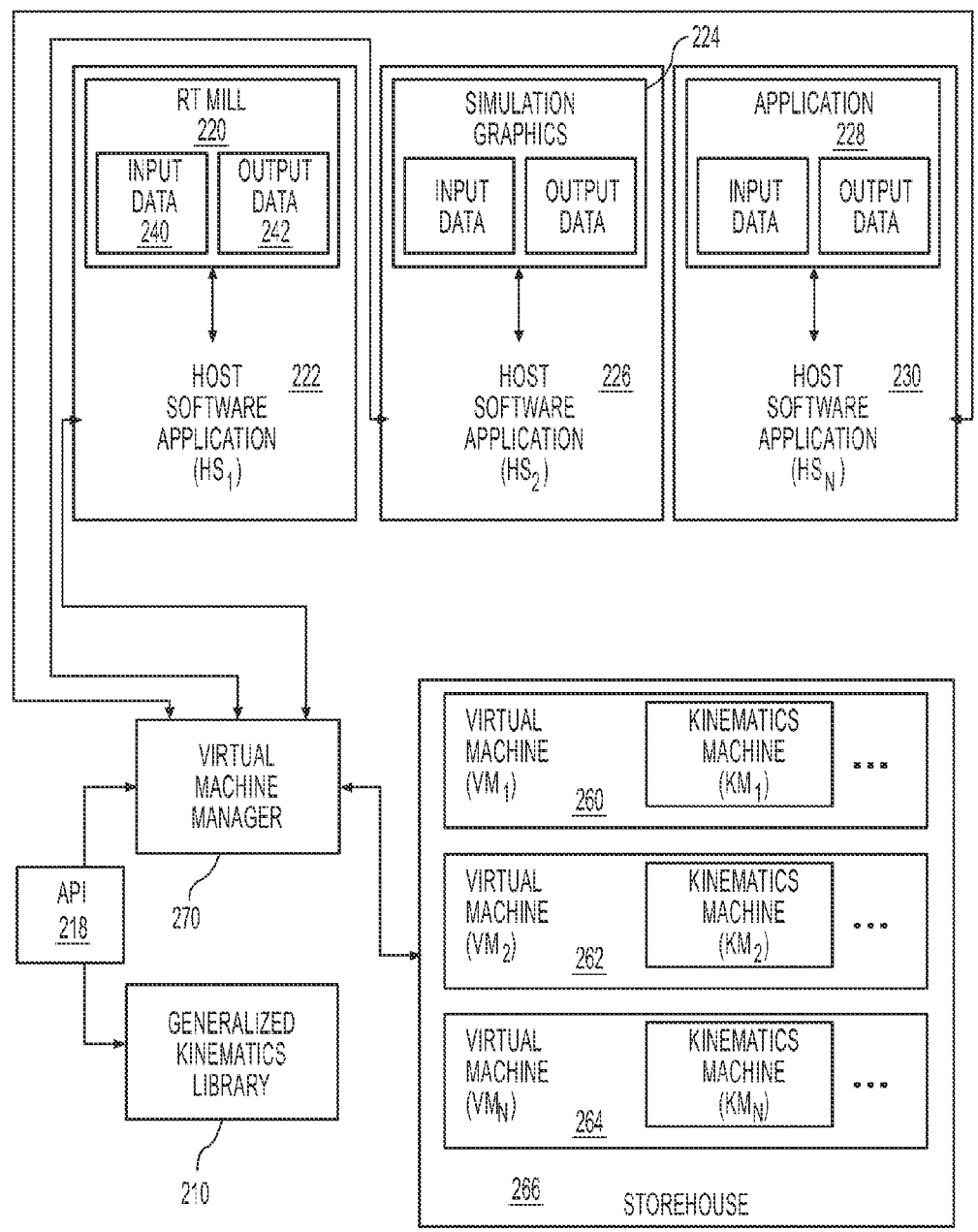
FIGS. 2A and 2B illustrate a representative view of a portion of a motion control system of the exemplary machine tool system of FIG. 1.
Figure 2B:
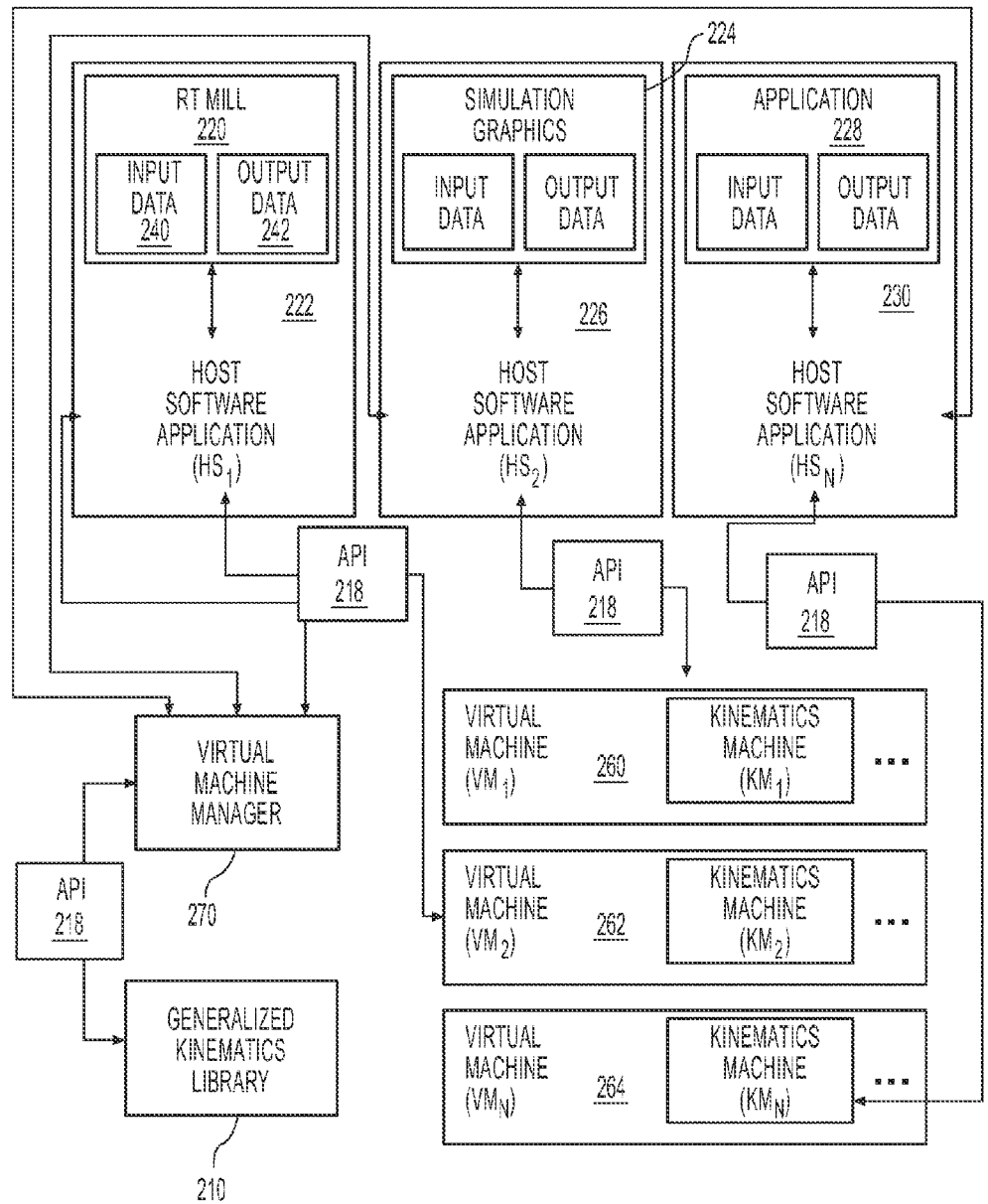

Referring now to FIGS. 2A and 2B, in one embodiment, software controller 202 is an object-oriented software component. In one embodiment, software controller 202 is based on the software described in U.S. Pat. No. 5,453,933 issued on Sep. 26, 1995 and titled CNC CONTROL SYSTEM, the disclosure of which is expressly incorporated by reference herein.

In one embodiment, software controller 202 includes an object oriented generalized kinematics library 210 and one or more host software applications 215. Each of the host software applications 215 interface with instances (identified herein as kinematic machines or virtual kinematics machines) of the generalized kinematics library 210 through an interface, such as an API interface 218 (see FIG. 2B). The host software applications 215 interface to the kinematics machines through API 218 by communicating data via Set data functions and receiving data via Get data functions.

As explained in more detail in U.S. patent application Ser. No. 11/833,971, filed Aug. 3, 2007, titled "GENERALIZED KINEMATICS SYSTEM", the disclosure of which is expressly incorporated by reference herein, the generalized kinematics library 210 includes a collection of objects or classes from which objects may be derived that are used to develop virtual kinematics machines. In one embodiment, the machine configuration for an actual machine tool system is provided to software controller 202. Based on this machine configuration software controller 202 creates the virtual kinematics machine from the generalized kinematics library 210. The virtual kinematics machine is stored in memory. The virtual kinematics machine has the same configuration as the actual machine described in the machine configuration.

The design of the generalized kinematics library 210 allows for multiple instances of the generalized kinematics library 210 for different processes (different host software applications within the machine tool control software 200) to be generated. Each instance of the general kinematics library 210 is independent and may be used simultaneously. For example, referring to FIG. 2B one instance (or virtual machine) ($KM_2$) is used to interpret programs for the real-time running of the actual machine tool system 100 with a real-time mill ("RT MILL") application 220 managed through a first host software application 222. The RT MILL application controls the machine positions of motion systems associated with the axes 150, 152, 154, 156, and 158 to position the tool 141 supported by tool spindle 138 and the part 160. Exemplary motion systems include servo motors. The RT MILL application 220 may request additional position data 240 and receive in return machine positions 242. The machine positions 242 may be determined by the virtual kinematics machine communicating with host software application 222. Position data 242 does not need to be presented to the RT MILL application 220 all at once, but rather the position data may be placed on a stack that is read by the RT MILL application 220 as needed. Therefore, the system 100 may be moving from a first position to a second position (through a series of intermediate points) while virtual kinematics machine ($KM_2$) determines the steps to take from the second position to a third position, based on requests from host software application 222.

Another instance ($KM_1$) of generalized kinematics library 210 is used to display the real-time graphics and position data during program runtime on the machine tool system 100 with a simulation graphics application 224 managed through a second host software application 226. In one embodiment, the simulation graphics application 224 requests the current tool tip position to present on a display. This may be determined from the positions of all of the machine tool system axes positions.

A third instance ($KM_N$) of generalized kinematics library 210 may be used to interpret programs for different machine tool systems to display in graphics with application 228 through host software application 230. This third instance ($KM_N$) allows the user to program parts 160 for different machine tool systems than that which the software controller 202 is connected to and to check these programs using graphical verification. As such, a user of software controller 202 may be cutting a part 160 with real time mill application 220, such as the 5-axis machine illustrated in FIG. 1, while programming another part on a four axis machine defined by a different machine configuration for verification with a simulation graphics software application or, if connected, for provision to a real time mill application associated with the four axis machine.

Each of host software application 222, host software application 226, and host software application 230 interact with a respective virtual kinematics machine ($KM_2$), ($KM_1$), and ($KM_N$), respectively, stored in memory.

Figure 10:
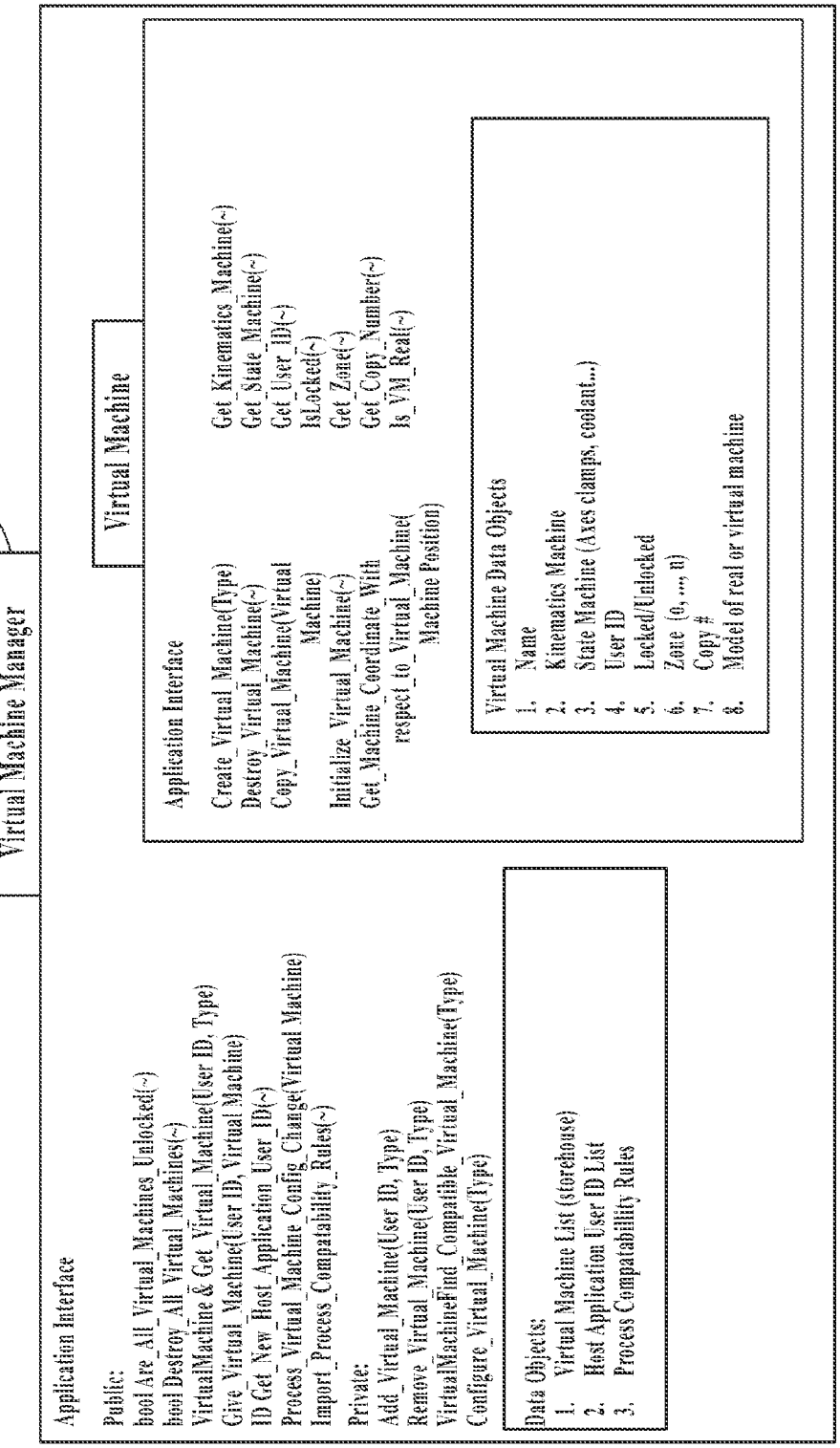
FIG. 10 is a representative view of the virtual machine manager.

Referring to FIG. 2A, host applications 222, 226, and 230 communicate with a virtual machine manager 270. As shown in FIG. 10, virtual machine manager 270 has a public interface through which it communicates with host applications 222, 226, and 230 and a private interface through which it manages a storehouse 266 of virtual machines. The storehouse includes a listing of the data objects associated with each virtual machine. Referring to FIG. 10, exemplary data objects for an exemplary virtual machine include a name of the virtual machine, a kinematics machine associated with the virtual machine, a state machine associated with the virtual machine, a user ID of the host application assigned to the virtual machine, a flag indicating whether the virtual machine is locked or unlocked, a zone associated with the virtual machine (for multi-zone systems), a copy value indicating which copy of a given machine the virtual machine is (1, 2, 3, . . . ), and a flag indicating whether the virtual machine corresponds to a real machine or a model. A virtual machine corresponds to a real or physical machine when the kinematics machine of the virtual machine corresponds to the kinematics of a machine tool accessible by host application. A virtual machine corresponds to a model when the kinematics machine of the virtual machine corresponds to the kinematics of a machine tool that is not accessible by the host application. Once a virtual machine is assigned to a host application, the host application communicates with the data objects of the virtual machine through API 218.

Virtual machine manager 270, as explained herein, controls the generation and assignment of virtual machines, such as virtual machines ($VM_2$), ($VM_1$), and ($VM_N$). The following description is related to the compatibility of the assigned kinematics machines, but may be used for any data objects of the respective virtual machines.

Figure 3:
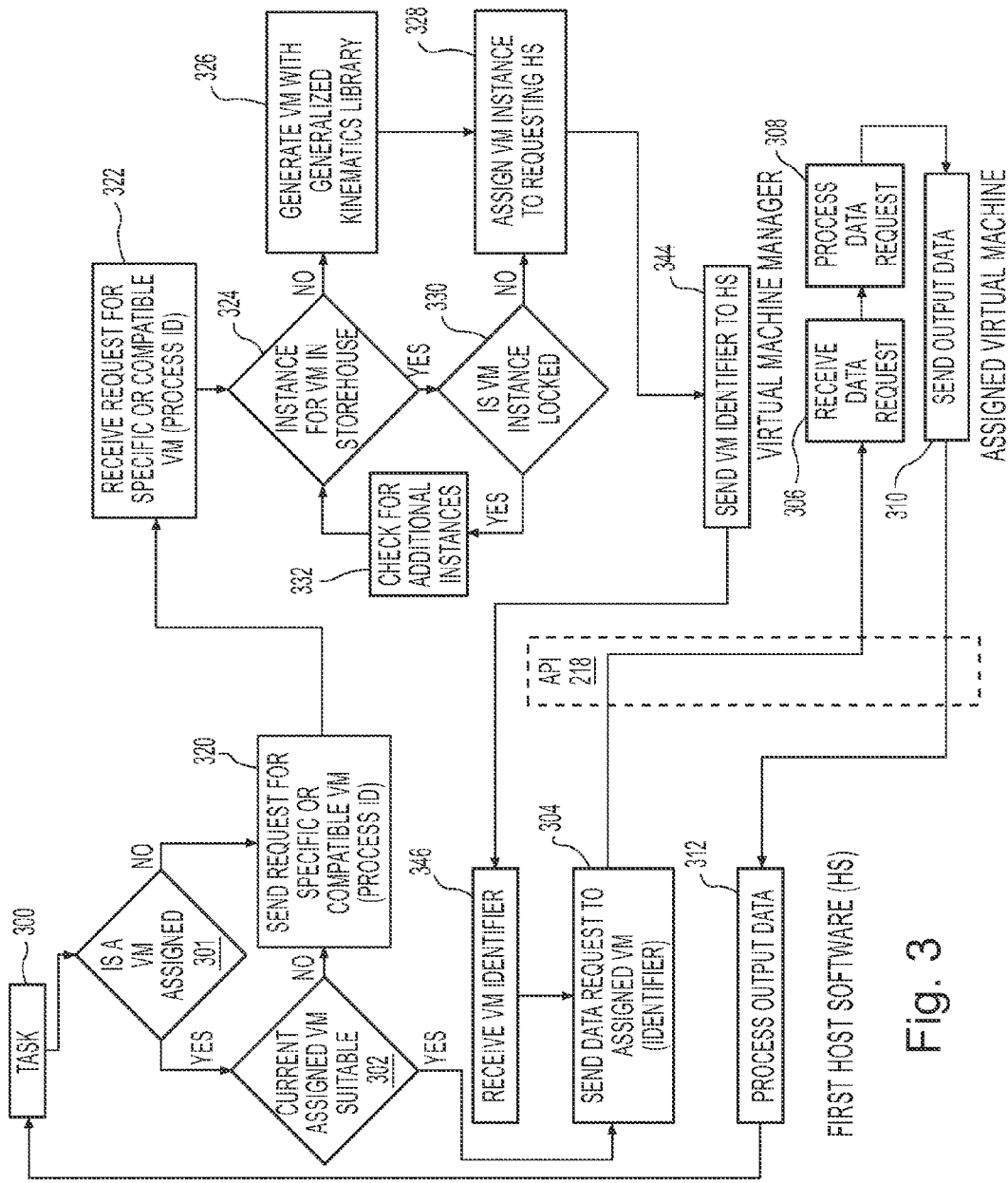
FIG. 3 illustrates a processing sequence related to the flow of information through an API of the motion control system illustrated in FIGS. 2A and 2B including interaction with a virtual machine manager module of the motion control system.

Referring to FIGS. 2A, 2B, and 3, the operation of virtual machine manager 270 is illustrated. A first host software application, for instance host software application 222, has a task to be completed, as represented by block 300. An exemplary task may be to determine the next position data for each of the axes associated with RT MILL application 220. Host software application checks to see if a virtual machine is assigned to it, as represented by block 301. If not, one is requested, as represented by block 320. If so, host software application 222 determines whether the virtual machine currently assigned to host software application 222, if any, is suitable for the task, as represented by block 302. If it is suitable, host software application 222 sends a data request to the appropriate data object of the currently assigned virtual machine (in this instance the kinematics machine), as represented by block 304. Host software application 222 can communicate with data objects of the currently assigned virtual machine through the API interface 218 (see FIG. 2B). The data object of the currently assigned virtual machine receives the data request, as represented by block 306. The data object of the currently assigned virtual machine processes the data request, as represented by block 308, and sends the associated output data back through the API interface 218 to host software application 222, as represented by block 310. The host software application 222 processes the received output data, as represented by block 312, and moves on to the next task, as represented by block 300.

Returning to block 302, if the currently assigned virtual machine is not useable for the requested task or if no virtual machines are assigned to the host software application, host software application 222 sends a request to virtual machine manager 270 for a different virtual machine, as represented by block 320. The host software application includes its process identification number if it already received one from the virtual machine manager 270. If the host software application has not received a process identification number, it requests a process identification number from the virtual machine manager 270. The process identification number is a unique number assigned to each calling host software application process that allows the virtual machine manager 270 to identify the calling process and tag any locked virtual machines with when the virtual machine manager 270 returns an instance of a virtual machine to the calling process. The calling host software application process also includes a machine specification of the virtual machine when requesting a virtual machine from the virtual machine manager 270. Exemplary machine specifications include an identification of a kinematics machine configuration for a specific machine tool system and an identification of a virtual kinematics machine for a class of machine tool systems, such as a machine tool system having at least three moveable axes. As such, the request may be for a specific machine tool or for a model that is compatible with a machine tool system. Other data objects may be identified in the request as well. For example, if the host software application is associated with an RT mill, the host software application should request that the virtual kinematics machine correspond to a real machine tool system for the machining environment (maybe a real machine tool for zone 2 of a multi-zone machine tool system).

Virtual machine manager 270 receives the request for a different virtual machine, as represented by block 322. Virtual machine manager 270 checks to see if a suitable (specific or compatible) virtual machine is present in the storehouse 266, as represented by block 324. If a suitable (specific or compatible) virtual machine has been generated, it would be identified in the storehouse 266. If not, virtual machine manager 270 will instantiate a new virtual machine, which will call generalized kinematics library 210 to generate a virtual kinematics machine for the instantiated virtual machine, as represented by block 326. Of course, virtual machine manager 270 must have access to the machine configuration data to instantiate a virtual machine. The generated virtual machine is assigned to host software application 222 in storehouse 266, as represented by block 328.

Returning to block 324, if a suitable virtual machine is present in storehouse 266, virtual machine manager 270 checks whether the suitable virtual machine is locked or unlocked, as represented by block 330. A virtual machine is locked when it is currently assigned to a host software application, and unlocked when it is not assigned to a host software application. A virtual machine may be unlocked when a host software application completes its use of it and notifies the virtual machine manager 270 to free the virtual machine. If the virtual machine is unlocked, virtual machine manager 270 assigns the virtual machine to the requesting host software application, as represented by block 328.

If the virtual machine is locked, virtual machine manager 270 checks to see if there is another suitable virtual machine in storehouse 266, as represented by block 332. If not, then in one embodiment, virtual machine manager 270 may make a copy of that virtual machine. If one exists, the status of that instance is checked, as represented by block 330.

The newly assigned virtual machine is not sent to the host software application. Rather, virtual machine manager 270 sends to the host software application an identifier of the newly assigned virtual machine, as represented by block 344. The host software application receives the identifier, as represented by block 346. The host software application uses the identifier to communicate with the virtual machine for further tasks through API 218, as represented by block 304. In one embodiment, the host software application may always release virtual machines it is not using at the end of its process execution. In one embodiment, a given host software application may request or retain assignments to virtual kinematic machines it is not currently using. For example, a host software application associated with an RT mill operating on a dual zone machine may request and retain the assignments to the virtual machines for each zone prior to executing real-time machining processing to minimize CPU load during machining. In one embodiment, the application may scan all upcoming tasks and request all of the virtual machine tools needed for those tasks. However, if the host software application is associated with a simulation graphics application, it may release all virtual machines not being actively used during process execution.

As stated above, virtual machine manager 270 may determine whether a virtual machine in the storehouse is compatible. As shown in FIG. 10, one of the data objects of the virtual machine manager 270 is a Process Compatibility Rules data object which is called by the private interface command of Find_Compatible_Virtual_Machine(Type), which applies the Process Compatibility Rules when searching the storehouse 266 for a compatible virtual machine to return to the calling Host Software Application. As mentioned herein, for milling operations, the Host Software Application must request the virtual machine model of a real milling machine that is on the network with the virtual machine manager 270. However, simulation processing that only models the tool moving about the workpiece will not necessarily require the exact virtual machine model for processing. A flexible compatibility rule system is used to determine whether the virtual machine manager 270 must generate a new virtual machine for the specification of the Host Application or whether it may return an existing available virtual machine from the storehouse.

The compatibility decision is based on rules provided in the Process Compatibility Rules data object. In one embodiment, a Compatibility Rule Matrix based on kinematics linkages is shown in the following table. The Host Application requests a virtual machine with a specified set of kinematics linkages and directs the virtual machine manager 270 to use the compatibility process in selecting a virtual machine. The virtual machine manager 270 applies the compatibility rules to determine whether to generate a new virtual machine or return an existing one.

Compatibility Rule Matrix

| Linkage request | Available Kinematics Linkage Types | | | | | |
|---|---|---|---|---|---|---|
| | XYZ | XYZ A(r) | XYZ B(r) | XYZ A(r) B(t) | XYZ A(t) C(r) | XYZ B(t) C(r) |
| XYZ | 1 | 1 | 1 | 1 | 1 | 0 |
| XYZ A(r) | 0 | 1 | 0 | 1 | 1 | 0 |
| XYZ B(r) | 0 | 0 | 1 | 1 | 0 | 1 |
| XYZ A(r) B(t) | 0 | 0 | 0 | 1 | 0 | 0 |
| XYZ A(t) C(r) | 0 | 0 | 0 | 0 | 1 | 0 |
| XYZ B(t) C(r) | 0 | 0 | 0 | 0 | 0 | 1 |

(r) Rotary Axis
(t) Tilt Axis
1 is compatible,
0 is incompatible

Additional parameters can be added to the compatibility check. For example, tilt axis preference and axes positive rotation direction parameters may be added to the compatibility check.

Figure 3A:
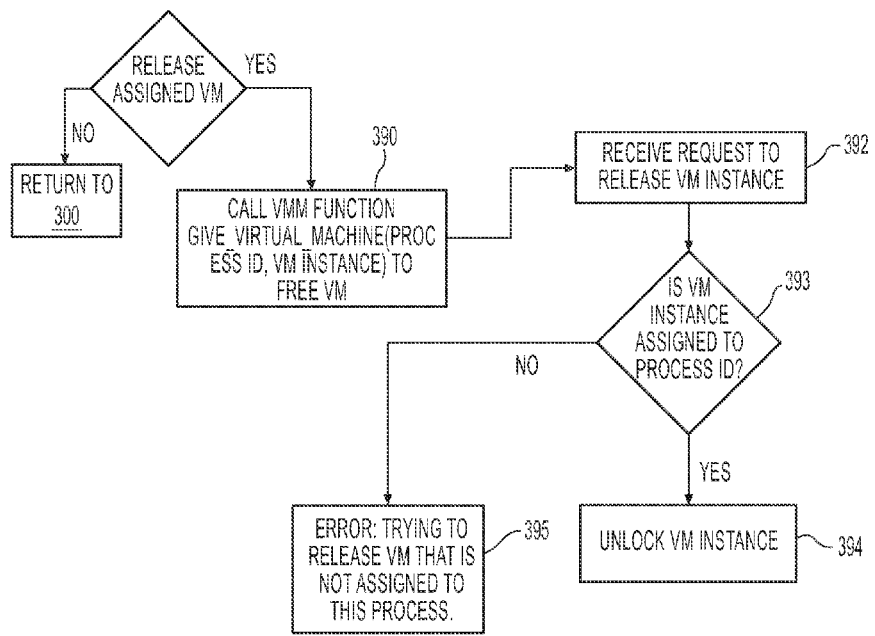
FIG. 3A illustrates a processing sequence related to freeing a virtual machine.

Referring to FIG. 3A, the host software application may decide to release a virtual machine instance. It is the responsibility of the host software application to notify the virtual machine manager 270 that it wants to release a virtual machine. The host software application usually releases a virtual machine, if at all, at an end of process. The host software application sends a request to release a virtual machine to the virtual machine manager 270, as represented by block 390. The virtual machine manager 270 receives the request, as represented by block 392, then checks whether the VM instance is assigned to the Process ID, as represented by block 393. If the VM instance is assigned to the Process ID, the virtual machine manager 270 unlocks the VM instance, as represented in block 394; otherwise, the virtual machine signals an error condition, as represented in block 395. This frees the virtual machine to be used to satisfy a later request received from a host software application.

Figure 4:
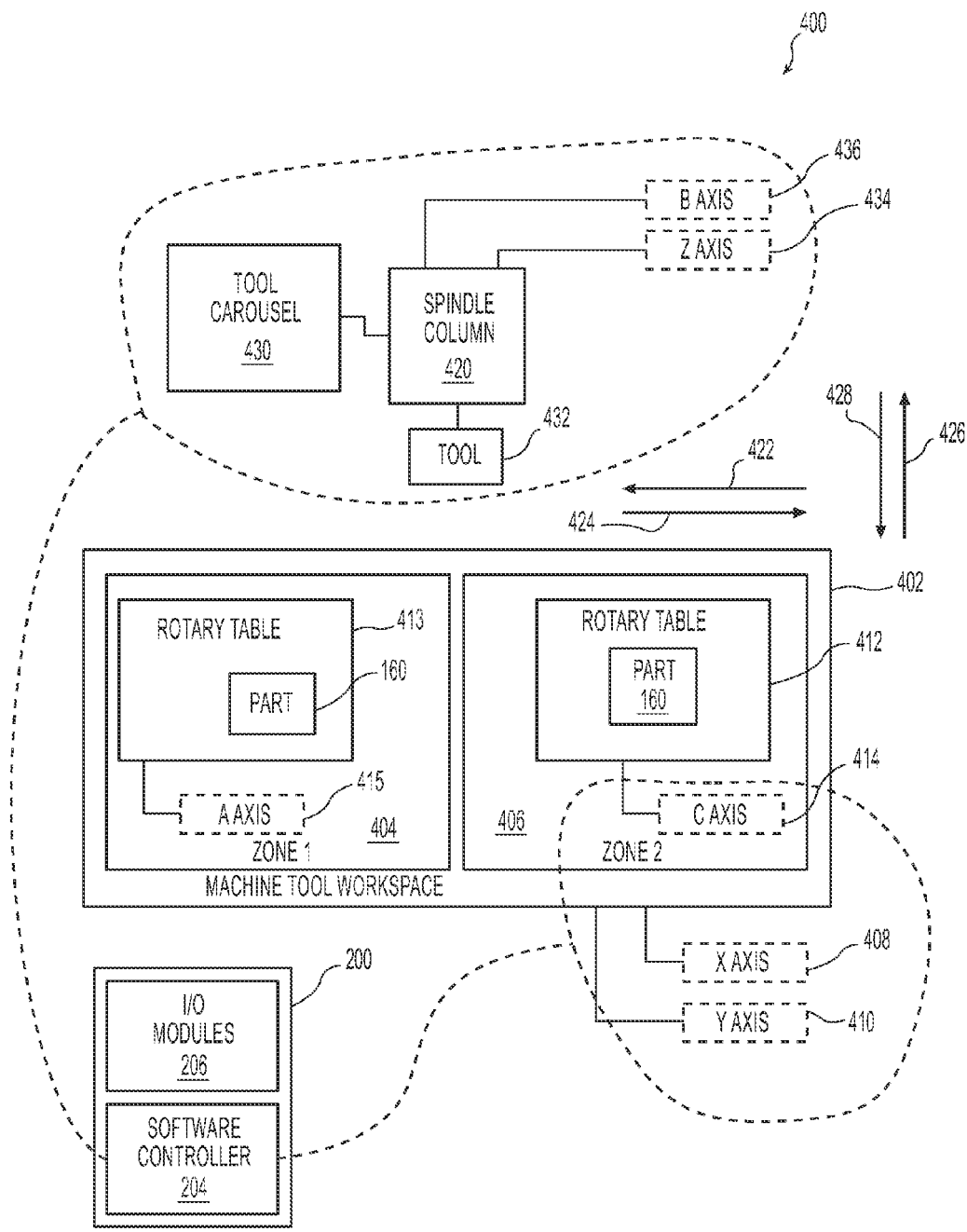
FIG. 4 illustrates an exemplary multi-zone machine tool system.

Referring to FIGS. 5-8 and 10-13, the operation of virtual machine manager 270 is illustrated for an exemplary set of tasks to be performed with a multi-zone machine tool system 400 which is shown in FIG. 4. Referring to FIG. 4, multi-zone machine tool system 400 has a machine tool workspace 402 within which a part 160 may be machined. As illustrated in FIG. 4, machine tool workspace 402 is divided into multiple zones, illustratively zone 1 404 and zone 2 406. Both zone 404 and zone 406 are provided on moveable supports which provide a x-axis 408 and a y-axis 410. Each of zone 404 and zone 406 may be further configured. For instance, zone 406 includes a rotary table 412 which provides a C-axis and zone 404 includes a second rotary table 413 which provides an A-axis 415. Each of x-axis 408, y-axis 410, A-axis 415, and C-axis 414 are controlled by motion control system 200.

Multi-zone machine tool system 400 also includes a moveable spindle column 420 which may be moved in directions 422 and 424 to travel between zone 404 and zone 406. In one embodiment, spindle column 420 is retracted in direction 426 as it is moved between zone 404 and zone 406. Spindle column 420 is then moved in direction 428 to engage the part 160 in the respective zone. In one embodiment, once in the respective zone 404 or 406, spindle column 420 does not move in any of direction 422, direction 424, direction 426, and direction 428. Spindle column 420 travels with a tool carousel 430 from which spindle column 420 selects a tool 432 for a current operation of motion control system 200. Spindle column 420 is configured the same as shown in FIG. 1 and provides a z-axis 434 and a B-axis 436.

Since zone 404 and zone 406 have different kinematics, the same virtual kinematics machine cannot be used for both zone 404 and zone 406. Additional details regarding multi-zone machine tool system 400 are provided in U.S. Patent Application Ser. No. 61/171,794, filed Apr. 22, 2009, titled "MULTI-ZONE MACHINE TOOL SYSTEM", the disclosure of which is expressly incorporated by reference.

Figure 5:
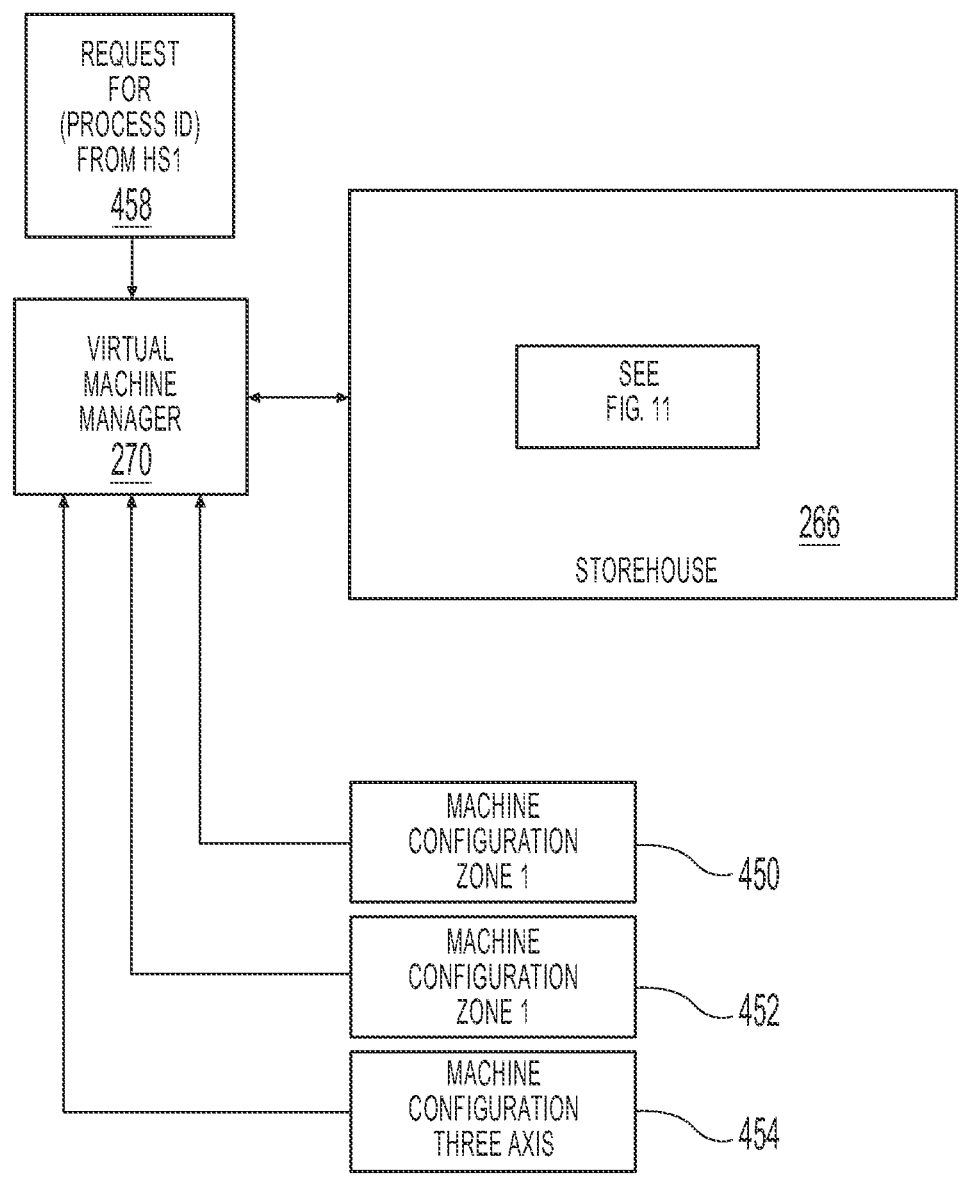
FIGS. 5-8 illustrate an exemplary management of virtual machines by the virtual machine manager of FIG. 3.

Referring to FIG. 5, virtual machine manager 270 has access to three machine configuration files which may be used to generate kinematics model instances via the generalized kinematics library 210 for virtual machine instances. Machine configuration 450 corresponds to the configuration of zone 404 of multi-zone machine tool system 400. Machine configuration 452 corresponds to the configuration of zone 406 of multi-zone machine tool system 400. Machine configuration 454 corresponds to a three axis machine tool system. If the kinematics configuration of either zone 404 or zone 406 is changed, such as the removal of rotary table 412, the operator may update the corresponding machine configuration 450 or machine configuration 452. An exemplary interface for providing a machine configuration is U.S. patent application Ser. No. 11/833,971, filed Aug. 3, 2007, titled "GENERALIZED KINEMATICS SYSTEM", the disclosure of which is expressly incorporated by reference herein.

Virtual machine manager 270 receives a request 458 from a first host software application (HS1) for a virtual machine associated with zone 404. In response, virtual machine manager 270 calls generalized kinematics library 210 to generate a first kinematics machine object 460 (see FIG. 11) which corresponds to zone 404. The virtual machine 460 is locked for HS1, as represented by block 462.

Figure 6:
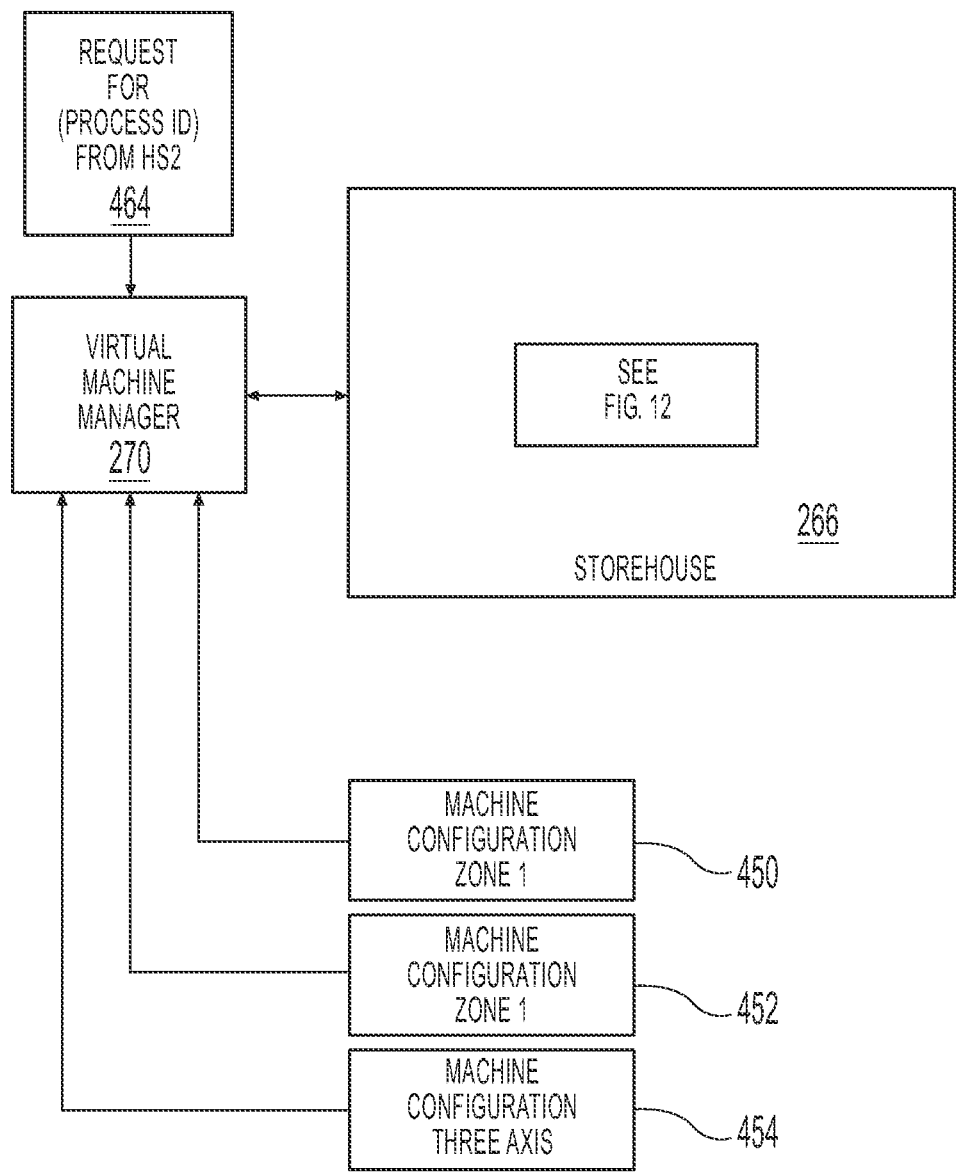

Referring to FIG. 6, virtual machine manager 270 receives a request 464 from a second host software application (HS2) for a virtual machine associated with zone 404. Virtual machine manager 270 checks to see if there are any virtual machines in storehouse 266 that satisfy the request (as shown in FIG. 11). The only one that does, first virtual machine 460, is currently locked for use by first host software application (HS1). As such, virtual machine manager 270 instantiates a second virtual machine 466 which corresponds to zone 404 or creates a copy of virtual machine 460. The virtual machine 466 is locked for HS2, as represented by block 468. Further, first host software application (HS1) has requested a virtual machine associated with zone 2 which is a real machine (HS1 is a milling process). Virtual machine manager 270 generates and assigns virtual machine 469 to first host software application (HS1).

Figure 7:
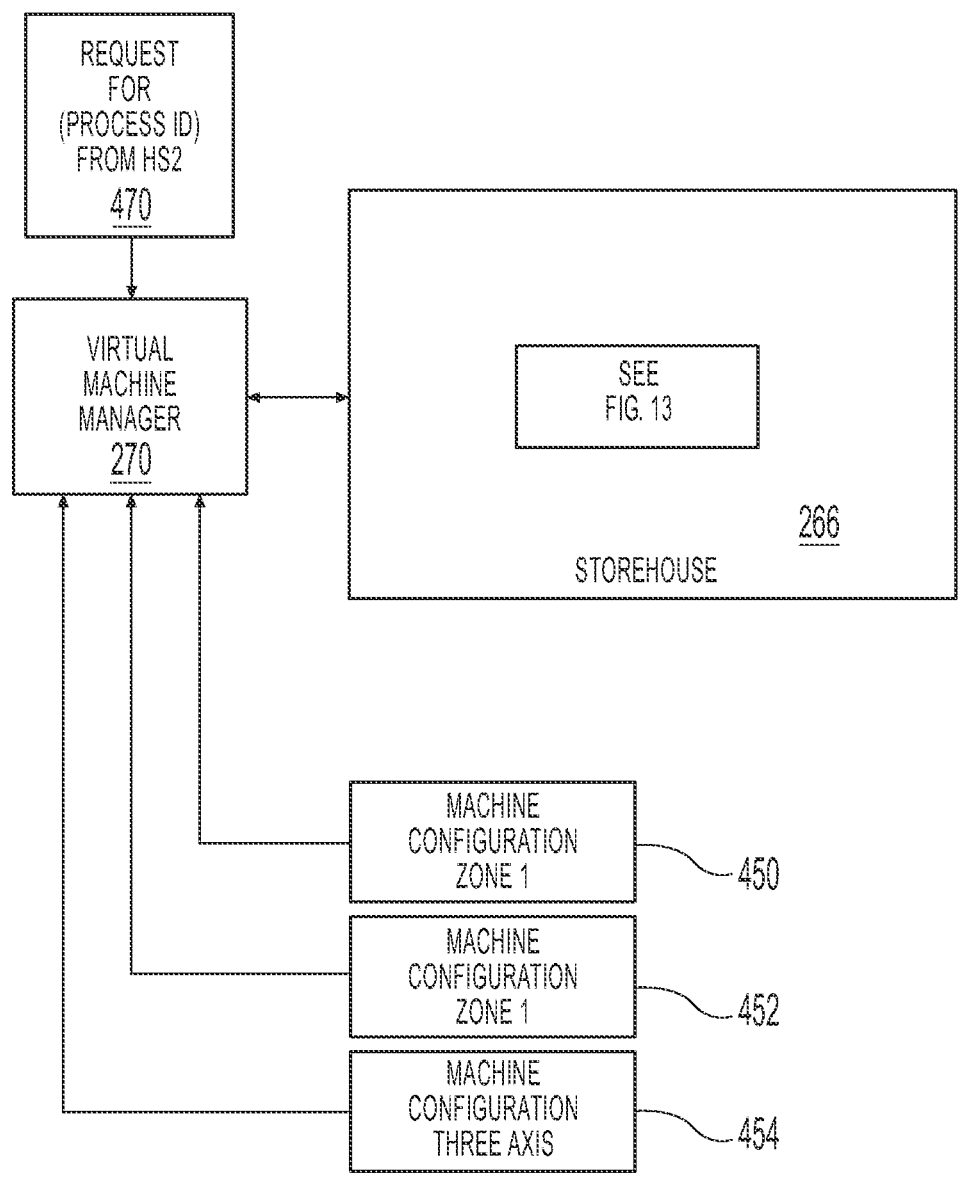

Referring to FIG. 7, virtual machine manager 270 receives a request 470 from a second host software application (HS2) for a virtual machine associated with or compatible to zone 404. Virtual machine manager 270 checks to see if there are any virtual machines in storehouse 266 that satisfy the request. Assuming zone 404 is a three axis machine, the SR virtual machine 471 in storehouse 266 (FIG. 13) which is compatible to a three axis machine according to the compatibility rules provided herein, is the only unlocked virtual machine that is compatible. As such, virtual machine manager 270 assigns SR virtual machine 471 to HS2. The virtual machine 471 is locked for HS2, as represented by block 474 in FIG. 14.

Figure 8:
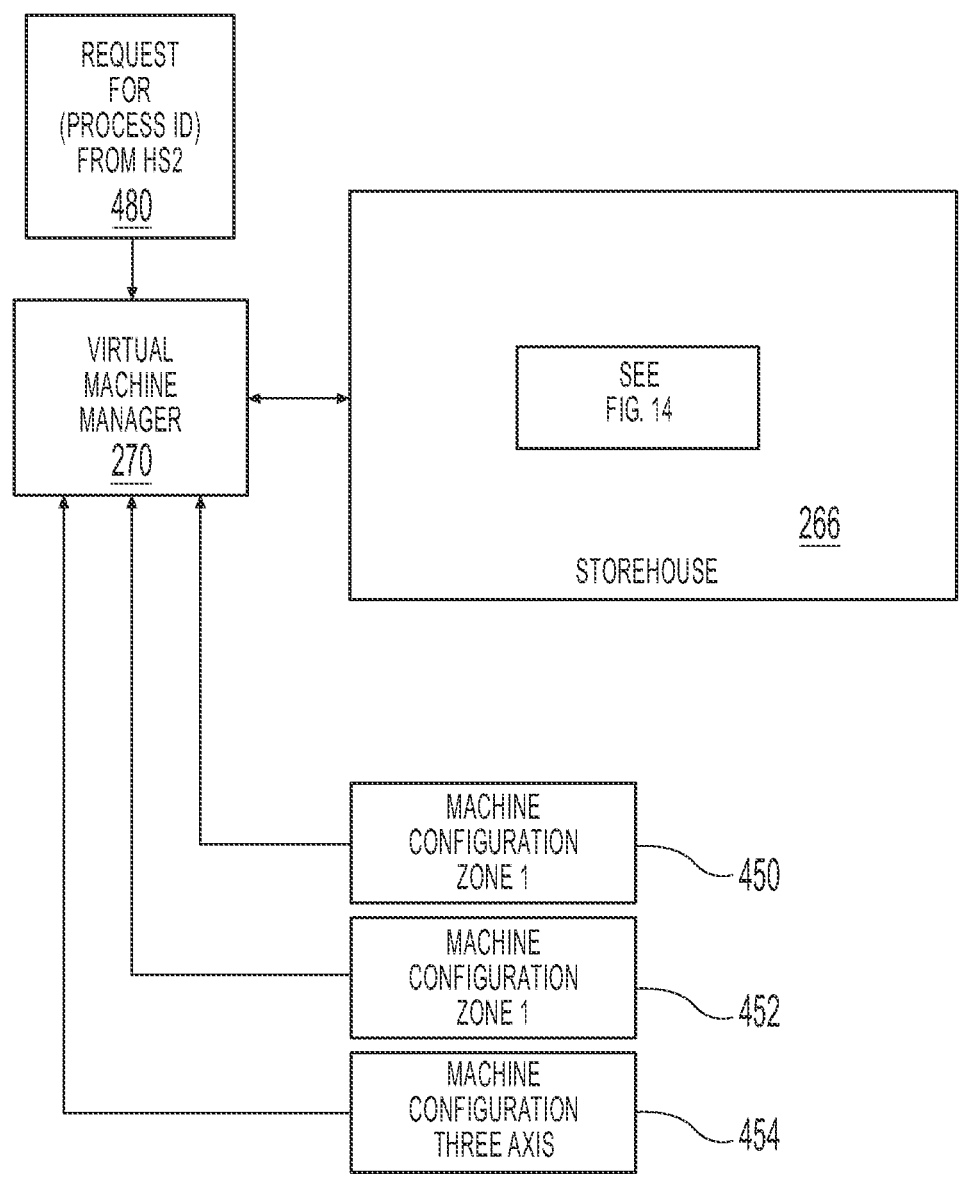

Referring to FIG. 8, virtual machine manager 270 also receives a request 480 from second host software application (HS2) to free virtual machine 466 previously assigned to second host software application (HS2). In response, virtual machine manager 270 marks virtual machine 466 as unlocked, as represented by block 484.

In one embodiment, the virtual machine manager 270 is an object-oriented system that manages the initialization and ownership of any number of virtual machine models in a CNC control. The virtual machine models consist of kinematics models and other information (as mentioned herein) that describe the state of a real or virtual machine. The virtual machine manager 270 has an API that allows calling processes to request a virtual model of a specific machine or to search for a compatible machine. The virtual machine manager 270 then searches its list of available machine models for the requested machine or for a compatible type as requested by the Host Application. If a virtual machine is not found, the virtual machine manager 270 will automatically create and configure a new virtual machine model for the calling object according to its specifications. Calling objects may relinquish their virtual machine models at any time whereupon the virtual machine manager 270 can redistribute the relinquished model to a different calling object. The virtual machining manager allows a CNC control to simultaneously handle and distribute multiple instances of virtual machine models of a machine that are used for various, simultaneous, and different processes such as graphical simulation and machine program run. The virtual machine manager 270 also allows the CNC control to change machine kinematics configuration on-the-fly by modeling each possible machine kinematics configuration as an independent virtual machine. The virtual machines may even share axes and work volumes with other virtual machines. For example, a dual zone CNC machine that has different axes configurations for Zone 1 versus Zone 2, can be controlled using the virtual machine manager 270 by creating at least two virtual models of the machine, one specific to each zone, that can be switched between during program run by the calling process.

Virtual Machine Manager Based Scheduling System

Since the Virtual Machine Manager (VMM) is a system that generates and tracks the use of virtual models of real or virtual machines, its application can be expanded beyond control and simulation of a machine tool. A work scheduling system can be developed that utilizes Virtual Models of all available machines to determine production runtimes, optimize machining schedules and work item schedules, organize multi-machine production scheduling, and determine suitability of different machines for any work item.

The VMM can query for available machines in a networked shop with online machines as described in U.S. patent application Ser. No. 12/178,422, filed Jul. 23, 2008, titled "METHOD AND APPARATUS FOR MONITORING OR CONTROLLING A MACHINE TOOL SYSTEM", the disclosure of which is expressly incorporated by reference herein. It can then populate its Storehouse by instantiating virtual machine objects based on copies of the virtual machine model of the machine residing on each machine control in the network (FIG. 9A). If some or all of the machines are offline, it can use a static database of machine configurations using configuration files copied from the available machines or exported virtual machine models from the machines. The advantage of a network system is that the VMM may also query current tooling status of each machine, which would allow the scheduling application to list additional tooling information in the schedule of each work item. The Scheduler Process can then use the tooling information in its search algorithms. While each machine has its own Tooling Database, described in, for example, U.S. patent application Ser. No. 11/890,384, filed Aug. 6, 2007, titled "SYSTEM AND METHOD FOR TOOL USE MANAGEMENT," the disclosure of which is expressly incorporated by reference herein, the VMM can organize a global shop Tooling Database to track tool use throughout the shop and across scheduled work items.

The VMM Compatibility Matrix (Compatibility Rules) can be used to determine the suitability of a work item for each of the available machines in the VMM to reduce the search scope for the Scheduler Process. The VMM may control the compatibility matrix, or the compatibility matrix may be defined by one or more of the host application processes. Different host application processes may have different compatibility matrices. The matrices may be created explicitly for all the machine types available in the VMM, or the compatibility matrices may be automated by giving the VMM one or more rules to populate the compatibility matrix or matrices, so that the matrix or matrices may be dynamic. For example, a milling process may provide the VMM with rules to populate the matrix or matrices. For example, a first rule may specify any 3 or more axis milling machine, a second rule may specify at least 3 linear axes, and a third rule may specify that the work volume or axes limits of the machine must be at least X1000 mm, Y400 mm, and Z250 mm. The graphics process for the machine may have two rules. A first rule may specify, for example, any 3 or more axis milling machine, and the second rule may specify, for example, at least 3 linear axes. In the example, the graphics process may not consider the work volume or axes limits of the machine. The example is a dynamic matrix in that the next job may request, for example, a smaller or larger work volume, so that the compatibility matrix for the next job may change.

Additional data beyond that described in FIG. 10 that will assist the Scheduler Process can be stored in the virtual machine objects. For example, data regarding spindle torque, spindle taper, probing system available or not available, or data regarding the tool or tools in Automatic Tool Changer magazine may be provided.

Figure 9B:
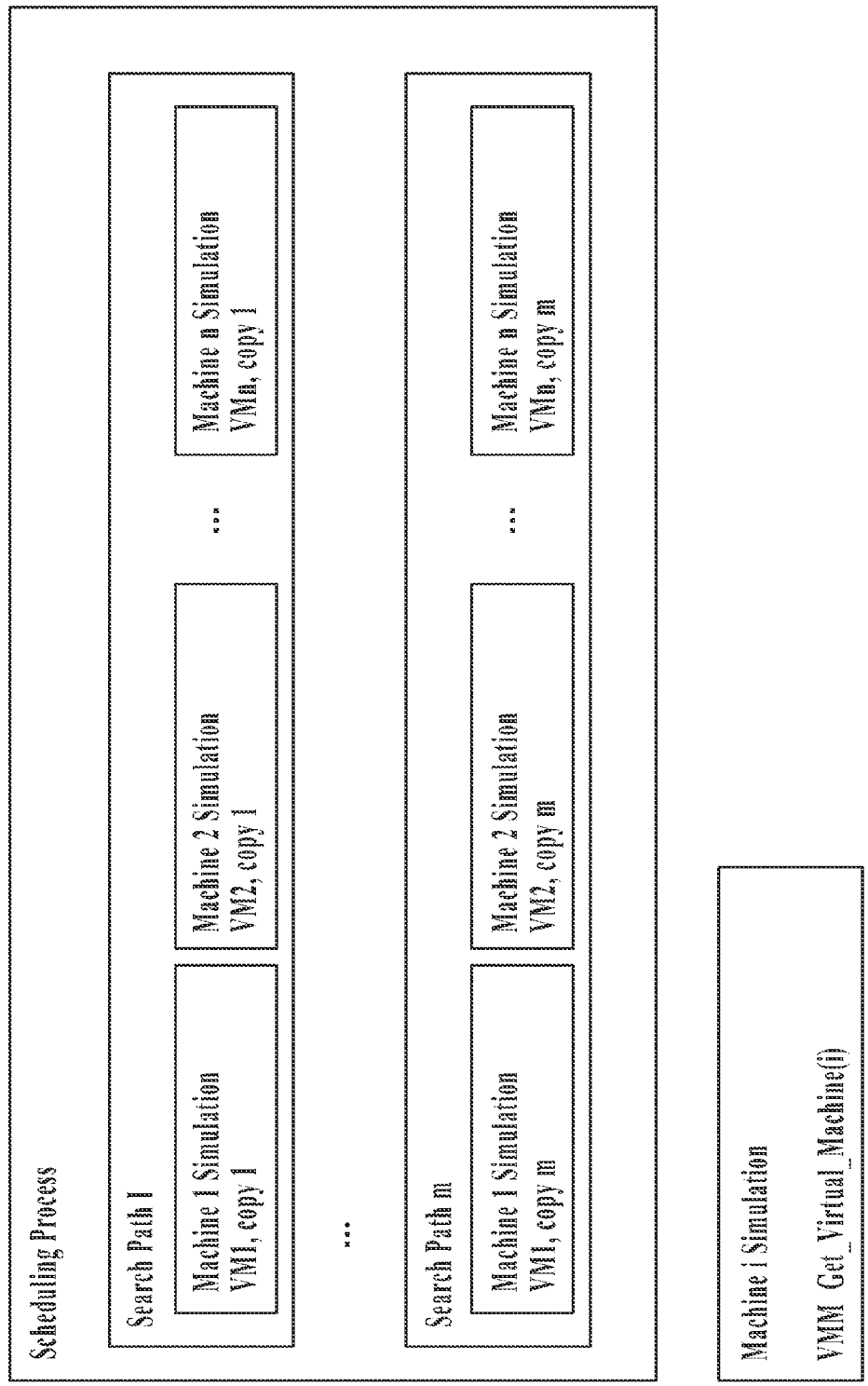

The Scheduler Process may use Artificial Intelligence (AI) to compute the optimized schedule. AI algorithms frequently implement simultaneous or multiple directed searches. The VMM can generate multiple copies of virtual machines for parallel processing of the search paths to accommodate these types of optimization methodologies. Multiple and simultaneous Simulation Processes may be invoked by the Scheduler Process to handle each search path as shown in FIG. 9B.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A machine manager, the machine manager comprising:
a storehouse, the storehouse including at least one virtual machine in an electronic storage, wherein each of the at least one virtual machines is associated with at least one virtual kinematics machine, each of the at least one virtual kinematics machines describing characteristics of a plurality of movable axes of at least one machine tool system; and
a virtual machine manager using one or more electronic processors, the virtual machine manager operable to receive an input, provide one or more virtual machines from the storehouse if the input is compatible with at least one of the virtual machines from the storehouse, and generate at least one new virtual machine if the input is not compatible with at least one of the virtual machines.

2. The machine manager of claim 1, wherein the new virtual machine is based on the at least one virtual machines from the storehouse.

3. The machine manager of claim 1, wherein the input is one or more part programs, the one or more part programs defining one or more geometries for a machined part.

4. The machine manager of claim 3, wherein the part program is entered by a conversational mode of operation.

5. The machine manager of claim 3, wherein the part program specifies machine independent information for machining a part.

6. The machine manager of claim 1, wherein a generalized kinematics system is used to create new virtual machines.

7. The machine manager of claim 1, wherein one or more machines are associated with the virtual machine manager.

8. The machine manager of claim 7, wherein the one or more machines are each represented by at least one virtual machine in the storehouse.

9. The machine manager of claim 7, wherein the virtual machine manager controls scheduling of the one or more virtual machines to optimize machining schedules and work item schedules.

10. The machine manager of claim 1, the virtual machine manager further comprising at least one process compatibility rule.

11. The machine manager of claim 10, wherein the process compatibility rule allows a virtual machine associated with a virtual kinematics machine that describes characteristics of a plurality of moveable axes of at least one machine tool system with a first number of axes to be provided based on an input that requires a second number of axes, provided the first number of axes is greater than or equal to the second number of axes.

12. The machine manager of claim 1, wherein the at least one machine tool system represents a virtual machine tool system.

13. The machine manager of claim 1, wherein the at least one machine tool system represents a physical machine tool system.

14. The machine manager of claim 13, wherein the physical machine tool system is a milling machine which is controlled to machine a part.

15. A method for creating a virtual machine, the method comprising:
providing a virtual machine manager using one or more electronic processors, the virtual machine manager operable to generate one or more virtual machines from a plurality of virtual machines stored in a storehouse, each of the virtual machines including at least one virtual kinematics machine, each of the at least one virtual kinematics machines describing characteristics of and determining position data specifying motion of a plurality of movable axes of at least one machine tool system;
receiving by the virtual machine manager a request for a virtual machine from a host application;
generating by the virtual machine manager a new virtual machine based at least in part on at least one of the virtual machines from the storehouse, the new virtual machine being generated to cooperate with the host application and using its at least one virtual kinematics machine to determine position data for use by the host application; and
providing by the virtual machine manager the new virtual machine to the host application.

16. The method of claim 15, wherein a generalized kinematics system is used to generate the new virtual machine.

17. The method of claim 15, the virtual machine manager further comprising at least one process compatibility rule.

18. The method of claim 17, wherein the process compatibility rule allows a virtual machine associated with a virtual kinematics machine that describes characteristics of a plurality of moveable axes of at least one machine tool system with a first number of axes to be provided based on an input that requires a second number of axes, provided the first number of axes is greater than or equal to the second number of axes.

19. The method of claim 15, wherein the new virtual machine is generated by copying one or more of the virtual machines from the storehouse.

20. The method of claim 15, wherein the at least one machine tool system represents a virtual machine tool system.

21. The method of claim 15, wherein the at least one machine tool system represents a physical machine tool system.

22. The method of claim 21, wherein the physical machine tool system is a milling machine which is controlled to machine a part.

23. A method for providing a virtual machine, the method comprising:
providing a virtual machine manager using one or more electronic processors, the virtual machine manager operable to select one or more virtual machines from a plurality of virtual machines stored in a storehouse, each of the virtual machines including at least one virtual kinematics machine, each of the at least one virtual kinematics machines describing characteristics of and determining position data specifying motion of a plurality of movable axes of at least one machine tool system;
receiving by the virtual machine manager a request for a virtual machine from a host application;
selecting by the virtual machine manager one or more of the plurality of virtual machines in the storehouse, based at least in part on a selection criteria, the one or more virtual machines being configured to cooperate with a host application and use its at least one virtual kinematics machine to determine position data for use by the host application; and providing by the virtual machine manager the one or more virtual machines to the host application.

24. The method of claim 23, the virtual machine manager further comprising at least one process compatibility rule.

25. The method of claim 23, wherein the virtual machine manager controls scheduling of the one or more virtual machines to optimize machining schedules and work item schedules.

26. The method of claim 23, wherein the at least one machine tool system represents a virtual machine tool system.

27. The method of claim 23, wherein the at least one machine tool system represents a physical machine tool system.

28. The method of claim 27, wherein the physical machine tool system is a milling machine which is controlled to machine a part.

29. The method of claim 23, wherein the process compatibility rule allows a virtual machine associated with a virtual kinematics machine that describes characteristics of a plurality of moveable axes of at least one machine tool system with a first number of axes to be provided based on an input that requires a second number of axes, provided the first number of axes is greater than or equal to the second number of axes.

* * * * *